United States Patent
Thomson et al.

(10) Patent No.: US 9,905,228 B2
(45) Date of Patent: *Feb. 27, 2018

(54) SYSTEM AND METHOD OF PERFORMING AUTOMATIC SPEECH RECOGNITION USING LOCAL PRIVATE DATA

(71) Applicant: Nuance Communications, Inc., Burlington, MA (US)

(72) Inventors: David Thomson, Madison, NJ (US); Michael J. Johnston, New York, NY (US); Vivek Kumar Rangarajan Sridhar, Morristown, NJ (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,477

(22) Filed: May 26, 2017

(65) Prior Publication Data
US 2017/0263253 A1 Sep. 14, 2017

Related U.S. Application Data

(63) Continuation of application No. 14/066,079, filed on Oct. 29, 2013, now Pat. No. 9,666,188.

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/228* (2013.01)

(58) Field of Classification Search
CPC ...... G10L 15/30; G10L 15/22; G10L 2015/22
See application file for complete search history.

(56) References Cited

U.S. PATENT DOCUMENTS

| 6,487,534 B1 | 11/2002 | Thelen et al. |
| 6,704,707 B2 | 3/2004 | Anderson et al. |
| 6,970,820 B2 | 11/2005 | Junqua |

(Continued)

OTHER PUBLICATIONS

Gomez, A.M. et al., "Speech-based user interaction for mobile devices," In Second ERCIM Workshop on Emobility, Tampere, Finland, May 30, 2008, pp. 49-63.

(Continued)

*Primary Examiner* — Angela A Armstrong

(57) ABSTRACT

A method of providing hybrid speech recognition between a local embedded speech recognition system and a remote speech recognition system relates to receiving speech from a user at a device communicating with a remote speech recognition system. The system recognizes a first part of speech by performing a first recognition of the first part of the speech with the embedded speech recognition system that accesses private user data, wherein the private user data is not available to the remote speech recognition system. The system recognizes the second part of the speech by performing a second recognition of the second part of the speech with the remote speech recognition system. The final recognition result is a combination of these two recognition processes. The private data can be such local information as a user location, a playlist, frequently dialed numbers or texted people, user contact list information, and so forth.

18 Claims, 4 Drawing Sheets

(56) References Cited

U.S. PATENT DOCUMENTS

| | | | |
|---|---|---|---|
| 7,212,970 B2 | 5/2007 | Rodrigo | |
| 7,529,677 B1 | 5/2009 | Wittenberg | |
| 7,890,329 B2 | 2/2011 | Wu et al. | |
| 8,005,680 B2 | 8/2011 | Kommer | |
| 8,185,392 B1 | 5/2012 | Strope et al. | |
| 8,195,468 B2 | 6/2012 | Weider et al. | |
| 8,265,928 B2 | 9/2012 | Kristjansson et al. | |
| 8,332,218 B2 | 12/2012 | Cross, Jr. et al. | |
| 8,352,246 B1 | 1/2013 | Lloyd | |
| 8,452,598 B2 | 5/2013 | Kennewick et al. | |
| 8,468,012 B2 | 6/2013 | Lloyd et al. | |
| 8,515,762 B2 | 8/2013 | Krumel et al. | |
| 8,571,857 B2 | 10/2013 | Mocenigo et al. | |
| 8,868,428 B2 | 10/2014 | Gruenstein et al. | |
| 9,530,416 B2 | 12/2016 | Stern | |
| 9,666,188 B2 * | 5/2017 | Thomson | G10L 15/22 |
| 2002/0194000 A1 | 12/2002 | Bennett | |
| 2003/0182113 A1 | 9/2003 | Huang | |
| 2004/0192384 A1 | 9/2004 | Anastasakos | |
| 2006/0009980 A1 | 1/2006 | Burke | |
| 2006/0190260 A1 | 8/2006 | Iso-Sipila | |
| 2006/0190268 A1 | 8/2006 | Wang | |
| 2006/0235684 A1 | 10/2006 | Chang | |
| 2008/0221880 A1 | 9/2008 | Cerra et al. | |
| 2009/0043573 A1 | 2/2009 | Weinberg et al. | |
| 2009/0178144 A1 | 7/2009 | Redlich | |
| 2010/0049516 A1 | 2/2010 | Talwar et al. | |
| 2010/0185448 A1 | 7/2010 | Meisel | |
| 2010/0312555 A1 | 12/2010 | Plumpe et al. | |
| 2011/0015928 A1 | 1/2011 | Odell et al. | |
| 2012/0130714 A1 | 5/2012 | Zeljkovic et al. | |
| 2012/0179464 A1 | 7/2012 | Newman et al. | |
| 2012/0253823 A1 | 10/2012 | Schalk et al. | |
| 2012/0265528 A1 | 10/2012 | Gruber et al. | |
| 2012/0296643 A1 | 11/2012 | Kristjansson et al. | |
| 2013/0006634 A1 | 1/2013 | Grokop et al. | |
| 2013/0030802 A1 | 1/2013 | Jia et al. | |
| 2013/0030804 A1 | 1/2013 | Zavaliagkos et al. | |
| 2013/0103404 A1 | 4/2013 | Burke et al. | |
| 2013/0144618 A1 | 6/2013 | Sun et al. | |
| 2013/0151250 A1 | 6/2013 | VanBlon | |
| 2013/0197915 A1 | 8/2013 | Burke et al. | |
| 2014/0278354 A1 | 9/2014 | Ganong, III | |
| 2015/0039299 A1 | 2/2015 | Weinstein et al. | |
| 2015/0079932 A1 | 3/2015 | Zelinka | |

OTHER PUBLICATIONS

M. Novak, "Towards large vocabulary ASR on embedded platforms," In *Proc. Interspeech*, Oct. 2004.

Chang, Y.S. et al., "CSR: A Cloud-assisted Speech Recognition Service for Personal Mobile Device," IEEE International Conference on Parallel Processing (ICPP), pp. 305-314, 2011.

Q. Li et al., "Automatic verbal information verification for user authentication," *IEEE Trans. Speech Audio Processing*, vol. 8, No. 5, pp. 585-596, 2000.

* cited by examiner

SYSTEM AND METHOD OF PERFORMING AUTOMATIC SPEECH RECOGNITION USING LOCAL PRIVATE DATA

PRIORITY INFORMATION

The present application is a continuation of U.S. patent application Ser. No. 14/066,079, filed Oct. 29, 2013, the contents of which is incorporated herein by reference in its entirety.

BACKGROUND

1. Field of the Disclosure

The present disclosure relates to automatic speech recognition and more particularly to a system and method of performing automatic speech recognition using an embedded local automatic speech recognition system using private user data and a remote network based automatic speech recognition system.

2. Introduction

Some auto manufacturers have indicated the desire to provide a virtual assistant capability using a network speech recognizer. A vehicle or other mobile device is often but not always connected to a network such as the Internet or a cellular network. When such a device is not connected to a network, there should be functionality for performing automatic speech recognition that is as close as possible to that obtained by a recognizer with network capabilities. As is known in the art, a local speech recognition system either in an automobile or on a mobile device may not have as much computing power as a network-based automatic speech recognition system. Accordingly, the results that may be obtained from a local automatic speech recognition system will typically be inferior to recognition performed in the network.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only exemplary embodiments and are not therefore to be considered to be limiting of its scope, the concepts will be described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses a need in the art to be able to perform automatic speech recognition in such a way as to coordinate a speech recognition task between a local embedded speech recognition system and a remote or network-based speech recognition system in such a way that can use as well as protect private data. For example, a user may have private data on a local device that the user does not desire to be shared in a network. Such data can include such things as a user's contact list, frequently dialed numbers, a user location, a user's music or video play list, and so on. However, such local private information may be useful in terms of performing automatic speech recognition in that the user may, in voicing a command or an instruction, use a friend's name or a street name or artist name or song title. Accordingly, private information would be helpful in terms of speech recognition, but a mechanism that is disclosed herein enables such information to be utilized for automatic speech recognition but maintained privately such that it is not transmitted into the network for use by a network-based speech recognition system.

Figure 1:
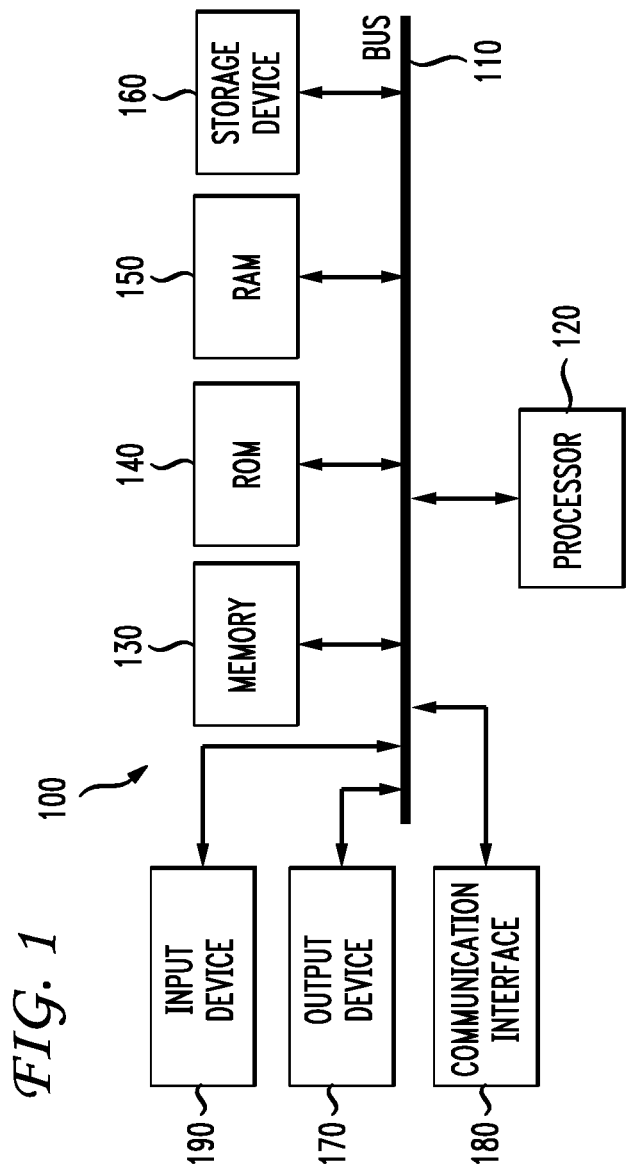
FIG. 1 illustrates an example system embodiment.

Prior to proceeding with the discussion of the present disclosure, a brief introductory description of a basic general-purpose system or computing device is shown in FIG. 1 which can be employed to practice the concept disclosed herein. A more detailed description of the concepts of this disclosure will then follow. The disclosure now turns to FIG. 1.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the concepts can operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the concepts disclosed herein operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
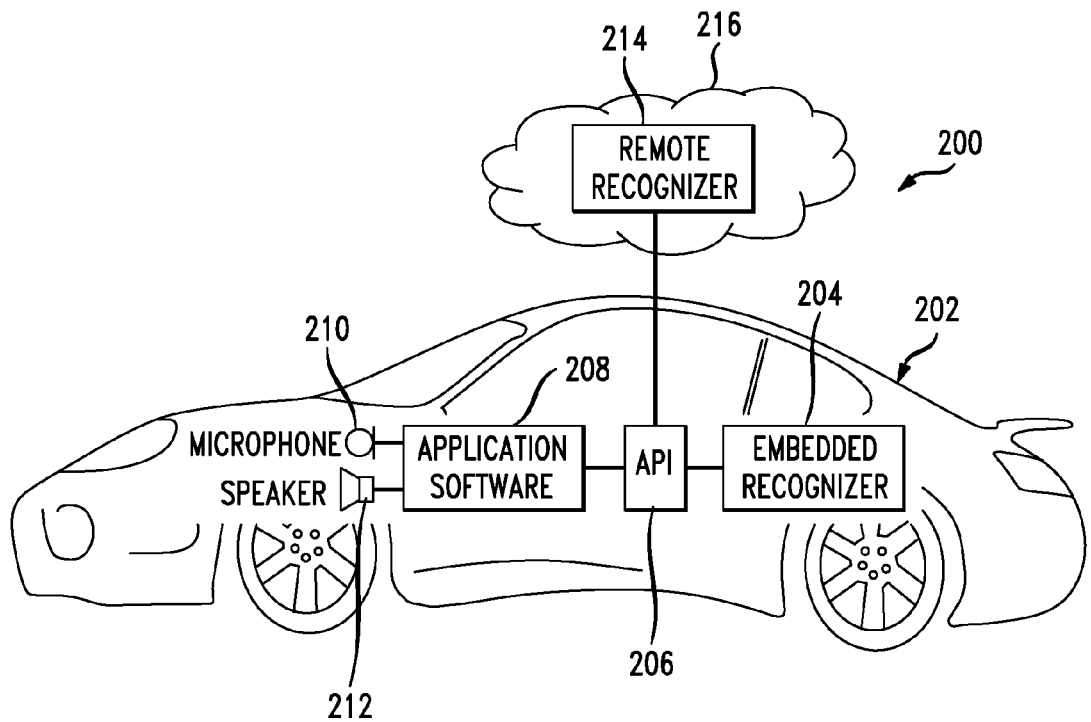
FIG. 2 illustrates a two recognizer solution.

The disclosure now turns to more particular features of the solution. In one aspect, the proposed solution is a hybrid recognition arrangement with an embedded recognizer in a car or on another mobile device and a network recognizer in "the cloud." FIG. 2 illustrates such an arrangement. Although the system 200 is shown including a car 202, clearly the structure can also be provided on a mobile device or other device with the same or similar functionality. As is shown in FIG. 2, the system includes a software application 208, an application programming interface (API) 206 and an embedded recognizer 204. Other features include a microphone 210 and a speaker 212. The API 206 communicates via a network 216 with a network-based speech recognition system 214. The network recognizer 214 has the benefit of more central processing power, more memory and better network connectivity. The embedded recognizer 204 can implement a speech recognition model that can access private user data.

Both recognizers can be used serially or in parallel to join or arrive at a recognition result. At least some user information is available to the embedded recognizer 204 and not to the network recognizer 214. Recognizer 214 could also simply be remote from recognizer 204 physically or virtually. For example, in a local device (which can be a separate device such as a smartphone or mobile device or the combination of features 204, 206 and 208 in FIG. 2), additionally, there can be a memory which stores such data as a user's contact list, frequently dialed numbers and called/texted names, user location, a user's music or video play list including frequency of use, and other private data. Private data may also include a user's history, including audio or text from previous interactions with the system, previous locations, etc., or data derived from the user's history such as a record of frequently used words or acoustic parameters of the user's voice. A user's private contact list can be used by voicemail transcription, voice dialing, and short messaging service messaging to determine a recipient of the message. The contact list may be used to narrow down the list of possible names recognized to more accurately determine which name was spoken and to determine the correct spelling. A database of frequently dialed numbers called or texted/emailed names could be used to refine candidate probabilities in recognizing the spoken name or number in a speech command from the user. A user location could be used in a navigation or a point of interest serviced to narrow down the list of street names, cities, businesses or other points of interest according to the location of the user or a direction of travel or a direction the user is facing based on such data. The various pieces of data associated with private interactions as set forth above is not meant to be an exhaustive list. There also may be data saved from a status of a video game the user has been playing, or scores or names in fantasy football tournaments the user has played or is playing, or downloaded articles from news sources that are stored locally. Thus, the private user data is broad enough to encompass any such data beyond just data stored in a contacts list. Private data may be stored locally, in a network, or derived from multiple local and remote sources.

With a music or video play list, the various data such as the artist, track title, album title and so forth could be used to recognize requests such as "play something by the Beatles" or "what movies do I have starring Harrison Ford?" Knowing the user's listening habits help to guide the recognition to the most likely candidates. In another aspect, the network's speech recognition system 214 can receive a speech request and return multiple hypotheses, each making different assumptions. For example, the mobile system may report 3 possible locations and the network recognizer 214 could return 3 corresponding results. The embedded recognizer 204 can then use private user information or some other criteria to select a most likely assumption or set of assumptions and the associated hypothesis. In this regard, utilizing local private user data may help improve the speech processing. The embedded speech recognizer 204 may also operate alone when the network speech recognizer 214 is unavailable such as when there is a lack of a connection to the network.

Furthermore, the approach disclosed herein may minimize the use of network bandwidth needed to send information such as user metadata between a device and the network 216. The metadata can include lists of data about the user such as a part or all of an address book, song catalog, etc. Such data can take up a large amount of bandwidth Metadata can also refer to any data typically outside of an actual message such as instructions from a user "SMS John this message . . . meet me at home." In this case, the "SMS John this message" portion is metadata outside of the actual message, which is "meet me at home." Accordingly, the solution disclosed herein can retain advantages of embedded automatic speech recognition with respect to privacy and operation when the network is unavailable while also maintaining the benefit of a network-based speech recognition system 214 which has more central processing unit power and access to other on-line resources.

One example discussed next is for a short messaging service (SMS) application, where a powerful dictation model which runs best on the network 214 recognizes a message. The system may also identify from the message the addressee of the message. This data may be taken from metadata and not within the message itself. When the name is in the message, in order to perform recognition of such data, the system may need to access the user's contact lists in order to properly recognize the name. The process to recognize the addressee can run on a local embedded recognizer 204. A similar approach for other cases can exist where private information is mixed with dictation from the user. This can occur in situations such as in a calendar application where a user may dictate a meeting description along with names of contacts or meeting participants. The system may also analyze the contacts list in order to properly recognize a name that is not fully spelled out in a message. The message may say "DL, are you coming tonight?" The system can analyze the message to determine that "DL" is likely a name, and then obtain from a private contacts list the understanding that DL is a friend of the sender. Thus, the system can return an identification of the addressee as David Larson.

Figure 3:
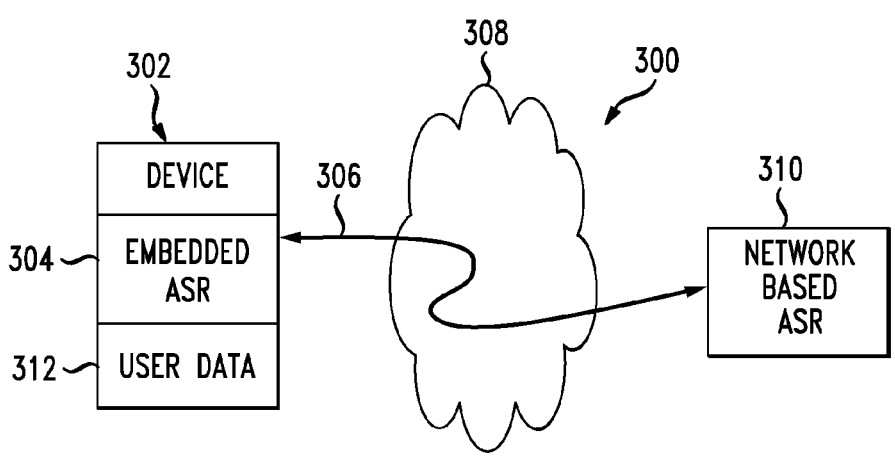
FIG. 3 illustrates another embodiment in which an embedded speech recognizer coordinates with a remote speech recognizer.

FIG. 3 illustrates a more general approach 300 in which a device 302 includes an embedded automatic speech recognizer 304 communicates 306 through a network 308 with a network-based automatic speech recognizer 310. In the example of an SMS message, assume that message speech utterance is sent from a device 302. The speech may be sent to another device not shown but data associated with the speech is sent 306 to the network-based speech recognition system 310. Assume that in the speech utterance is a user's name—Bartholomew. The network recognizer 310 uses a placeholder in place of the user's name and returns to the device 302 a lattice word confusion matrix or n-best list. The placeholder can cover any entity such as a name, location, playlist song, recipient name/phone number, favorite food, birthday or other day, etc. The local embedded system 304 evaluates the network recognizer's output 306 through the network 308 in light of user data 312 to select the final answer. A placeholder for names may be such things as a garbage model, phonemic language model, a language model based on a standard list of names, a context-free grammar, and/or a statistical language model built from the user's contact list, but where the individual names would not be extractable from the statistical language model. Of course, this utilizes the contact list as an example but any other kind of data such as calendar data, play list data and so forth could be used. In other words, the placeholder may be for a street name, or a current location of the user, and so forth. Using a context-free grammar could also obscure the contacts list, or any other related data, since it would not necessarily show which first names go with which last names.

The name may be part of a message ("Hey, Bartholomew, call me or die.") or separate from the message, such as part of a preamble ("SMS Bartholomew, call me or die.") The "SMS Bartholomew" in this example is an instruction to the system to send an SMS message to Bartholomew, and the message that is sent is "call me or die."

In one aspect the network recognizer 310 recognizes the full utterance it receives 306 and the intent (for example to send an SMS) and benefits from the network model for the transcription portions of the data, such as the actual SMS message. For the addressee, the system can use a placeholder such as a garbage model, a large name list, or a statistical language model built from the user's contact list, a model based on metadata and/or private data, some other kind of phoneme level model, and/or a phonemic language model. The network recognizer's output 306 can look something like the following:

"Send SMS to _ADDRESSEE_ [message] I'll see you at 5:00 [\message].
[intent=SMS]"

The above result can be sent to the local client device 302 along with word timings. The "intent=SMS" is an intent classification tag and represents an example of how a recognizer may output the intent separately from the transcribed text string. The embedded recognizer 304 can use the word timings to analyze a portion of the audio, stored locally, that corresponds to _ADDRESSEE_ and run that audio against a local model containing the user's actual contacts to determine the spoken contact name. The contact name is then inserted into the recognized string such as follows:

"Send SMS to [name] Bartholomew [\name] [message] I'll see you at 5:00 [\message]."

As a variation on the previous solution, the local recognizer 304 can process the entire audio instead of just the part corresponding to _ADDRESSEE_, then it can extract a name and insert it into the recognized string.

In an alternative embodiment, both recognizers 304, 310 can return a result and the outputs (such as best, n-best, word confusion matrix or lattice) are compared in a ROVER-style fashion. ROVER means recognition output voting error reduction. The embedded recognizer's answers may be given preferential weight for words derived from the user's contact list or other user data.

Another variation could be to assign a portion of the utterance (such as "send an SMS message to John Smith) to the embedded recognizer 304 and another ("meet me a 5:00") to the network recognizer 310. As similar approach may be to let one recognizer parse the utterance, recognize part, and assign the other part to the other recognizer. Similarly, in another approach, the system may allow for the embedded recognizer 304 to send the recognized words that it derived from user data to the network recognizer 310, which then uses this information to generate an output. This exposes some data from the user's spoken request, but not from the entire set of user data. Indeed, the data that could be chosen in this case may be generic names that would not provide much information regarding the user. For example, names like "Mark" or "Matt" might be sent whereas other specific names such as "Kenya" may not be send inasmuch as they are deemed to be unique enough so as to have more relevance to the user and thus reveal too much private information.

In another aspect, the system can run both the embedded recognizer 304 and the network recognizer 310 and then use output from one or the other based on the recognized user intent, confidence scores from one or both recognizers, or other criteria. The embedded recognizer 304 may take control for simple utterances that require user metadata and the network recognizer 310 can process utterances that require high accuracy but not private information. For example, if the user dictates an email message, the network recognizer's output 306 is used. If the user speaks a car control function ("turn up the heat"), then the output generated by the embedded recognizer 304 is kept local on the device 302 and neither audio nor recognized result are transmitted 306 to the network-based server 310.

In another example, the system can pinch the phonetic lattice for the portion of the utterance with a TAG or likely name. A sequence matching algorithm such as a Smith-Waterman algorithm can take into account a cost matrix (based on a priority confusability) and can be used to match the pinched lattice against the entries in the list that needs to be kept private. It is expected that the large cross-word triphone model in the network will generate a more accurate phonetic lattice.

The concept of a pinched lattice is discussed next. Suppose the 1-best hypothesis of the input utterance is recognized as "send SMS message to _NAME Noah Jones." From the entire lattice that generated the best path hypothesis, the system can take all the paths starting with a timestamp at or a few milliseconds before the word "Noah". This is called a pinched lattice because the system is zooming in on a particular portion of the lattice. The system can perform such pinching at the word lattice or phone lattice since the start and end times of interest are known.

The pinched lattice (i.e., the portion of phonetic lattice) may have several paths. Given a predetermined private list of names and the pinched lattice along with a phonetic confusion matrix for a particular acoustic model, the system can find the closest match of the lattice with respect to the name list. For example, the system can determine that "Norah Jones" is the highest re-ranked name after this process. The closest match problem can be formulated as a sequence matching problem if the system expands out all the private names into their phonetic transcription and performs a match with the pinched lattice.

To simplify development integration work, the embedded recognizer 304 and the network recognizer 310 can also share an API within the device 302. The API can be a software module that accepts requests from application code and routes requests to one or both recognizers as needed. The decision of which recognizer (304 or 310) or both should be invoked can be transparent to the application that is requesting the speech recognition.

A benefit of the solution disclosed herein is that it allows users to retain private date on a mobile device and not share it with a network recognizer. Thus, the user maintains control of sensitive information and need not have a trusted relationship with the network provider. At the same time, the disclosed concepts provide at least some of the benefit of giving a local system access to the network recognizer 310. The concepts also provide a consistent user experience when the network is disconnected or reduce the required network bandwidth.

Figure 4:
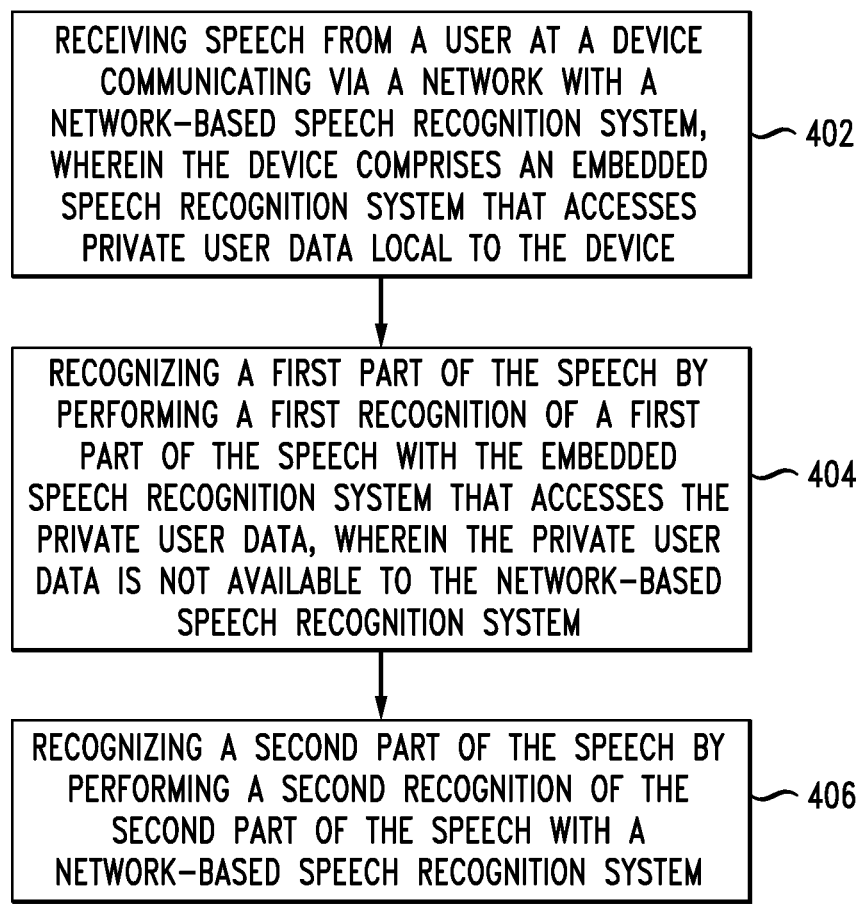
FIG. 4 illustrates a method embodiment.

FIG. 4 illustrates a method embodiment of this disclosure. As shown in FIG. 4, the method, when practiced by an appropriate system, includes receiving speech from a user at a device communicating via a network with a network-based speech recognition system, wherein the device includes an embedded speech recognition system that accesses private user data local to the device (402). The network-based speech recognition may also simply be remote from the embedded speech recognition system. For example, the system may not be network-based but simply physically or virtually remote from the embedded system.

The system recognizes a first part of the speech by performing a first recognition of the first part of the speech with the embedded speech recognition system that accesses the private user data, wherein the private user data is not available to the network-based speech recognition system (404). As noted above, the private data can be any type of data on the device such as contact information data, location data, frequently called numbers or frequently texted individuals, usage history, and so forth. Depending on the type of data and where it may be stored, the system can assign different parameters which indicate the level of privacy. For example, if the location data indicates that the user is at work during the day, and that the user is commonly at work during the day, then that data may not have a high level of privacy. However, if the location information is unusual or not part of the standard routine of the individual, then the system may have a reduced level of privacy and utilize that data or transmit that data to the network based recognizer for recognition.

The system can recognize a second part of the speech by performing a second recognition of the second part of the speech with the network-based speech recognition system (406).

The first part of the speech can comprise data associated with a personal identification rather than words spoken by the user. In this scenario, the speech received from the system may be "email home and say I will be there in 20 minutes." There is no person that is identified within the speech. However, the system may know that when one says email "home" that a contact list of other database can indicate that that person is emailing his wife. Her name can be data that is associated with a personal identification rather than words actually spoken by the user. The user may also choose a recipient and then begin dictation of the message to that recipient. Since the user does not say "text Mom" or "Text home," but rather brings up his wife via a non-verbal method and then dictates "I'll be there in 20 minutes." The recipient data is not found within the dictation portion of the message. Thus, the recipient information is gathered from another source.

Next, recognizing the first part of the speech and recognizing the second part of the speech can further include receiving from the remote or network-based speech recognition system an entity associated with options to use for speech recognition. The system can evaluate the entity at the embedded speech recognition system in view of the private user data to yield an evaluation and then select a recognition result based on the evaluation. The system can receive data from remote or the network based speech recognition system which includes a placeholder in place of a name as noted above. The placeholder can be one of a garbage model, a language model based on a standard list of names, and a statistical language model built from a user's contact list. Similarly, the placeholder could relate to other things such as street names and could also include a garbage model, or a language model based one a standard list of street names that are commonly driven or around the home of a user and a statistical language model built from addresses either associated with a user's contact list or street names traveled by or near to the user.

Figure 5:
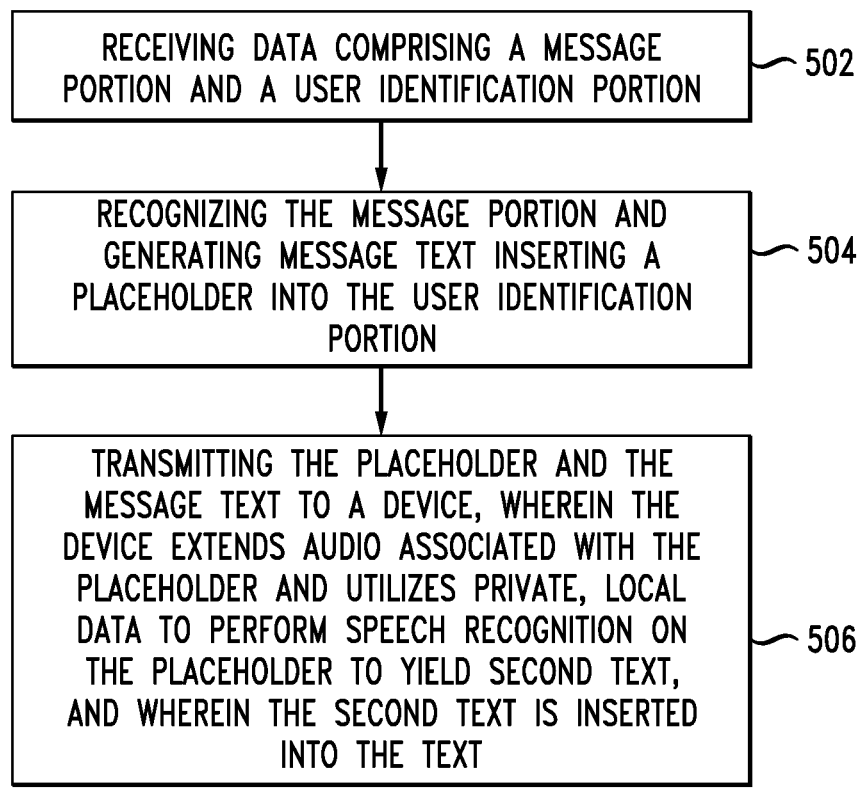
FIG. 5 illustrates another method embodiment.

FIG. 5 illustrates yet another method embodiment of this disclosure. First, the system receives data comprising a message portion and a user identification portion (502). The system recognizes the message portion and generates message text inserting a placeholder into the user identification portion (504). The system then transmits the placeholder and the message text to a device, wherein the device extracts audio associated with the placeholder and utilizes private, local data to perform speech recognition on the placeholder to yield second text, and wherein the second text is inserted into the text (506). An example of the method of FIG. 5 in practice could be the following. Assume that a remote or network-based automatic speech recognition system receives an audio signal or data that includes a message portion and user identification portion such as "Hello, Bartholomew, how are you today?" The system then would recognize the message portion but not the user identification portion (Bartholomew). It would generate message text inserting a placeholder into the user identification portion. For example, the generated message text could be something like "Hi, _NAME_, how are you today?" The system could then transmit the placeholder and the message text to a device such as a handheld smartphone, and the device could extract audio associated with the placeholder. In this case, the remote or network-based system would transmit to the device in addition to the placeholder a small portion of audio associated with the name "Bartholomew." In one variation, the remote or network-based system could transmit multiple names that have been determined to be reasonable matches, or a lattice of possible results, and the local recognizer could use this information, in combination with user data, to determine the final result.

It is noted that if the device had transmitted the entire data originally to the remote or network-based device, then returning the audio may or may not be necessary, since the network can return endpoint time markers instead. Some processing can occur to the audio at the remote or network-based device such as removing artifacts or background noise or performing some other processing which can improve the local speech recognition. In any event, the local device then operates on the placeholder and audio associated with the placeholder to utilize private, local data to perform speech recognition on or associated with the placeholder. In this case, the user may have a local private contact list that includes the name "Bartholomew." Speech recognition is therefore performed on the audio associated with the placeholder to yield the text representing the audio. The second text is generated and inserted into the overall message to yield the final text associated with the original audio which is "Hi, Bartholomew, how are your today?" In this manner, the system can blend the use of a more powerful network-based automatic speech recognition system and some available power on a smaller local device while utilizing private local data as part of the speech recognition process of a name.

Of course, the placeholder does not just have to relate to names but can relate to any words or any data that might be part of a private database, stored locally or in a private location in the network or at some other private storage location. This could include telephone numbers, street names, relationships such as wife, spouse, friend, dates such as birthdates, user history, and so forth. Thus the placeholder that is discussed could also relate to any other kind of data which is desirable to be kept private and which a user may prefer to have the automatic speech recognition occur locally in a manner in which private data may be used to improve the speech recognition process. The user history can include such data as audio or text from previous instructions, previous location information, and communications sent or received by the user, etc. The user history can also include data derived from the user's history such as a record of frequently used words, bolded or underlined text, or acoustic parameters of the user's voice.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, flash memory, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. A computer-readable device storing instructions expressly excludes energy and signals per se.

Although the above description may contain specific details, they should not be construed as limiting the claims in any way. Other configurations of the described embodiments of the disclosure are part of the scope of this disclosure. For example, the data held locally that is used for speech recognition might be metadata or tags of pictures or video on the local device. Any data that is considered private data can be utilized in the manner disclosed above for processing speech. Accordingly, the appended claims and their legal equivalents should only define the scope of coverage, rather than any specific examples given.

We claim:

1. A method comprising:
receiving, on a device, text as part of a message, a placeholder within the text and audio, wherein the device comprises an embedded speech recognition system that accesses private user data on the device;
receiving one of a garbage model, phonemic language model, a language model according to a standard list, and a language model built on the private user data to yield a received component;
determining a privacy level of the private user data;
recognizing the audio using the received component, the embedded speech recognition system and by accessing the private user data according to the privacy level to yield a recognition result; and
replacing the placeholder with the recognition result in the text to yield an updated message.

2. The method of claim 1, wherein the private user data is not available to a remote speech recognition system in communication with the device.

3. The method of claim 1, further comprising:
identifying a location of the device.

4. The method of claim 3, further comprising:
determining a privacy level of the private user data according to the location of the device.

5. The method of claim 1, wherein individual names from a user contact list are from the private user data.

6. The method of claim 1, wherein the private user data comprises one of data in a user contact list, frequently dialed phone numbers, frequently used texted names, data associated with a user location, data associated with a playlist, user history, and multiple hypothesis associated with private information.

7. A computer-readable storage device storing instructions which, when executed by a processor, cause the processor to perform operations comprising:
receiving text as part of a message, a placeholder within the text and audio, wherein the device comprises an embedded speech recognition system that accesses private user data on a computing device;
receiving one of a garbage model, phonemic language model, a language model according to a standard list, and a language model built on the private user data to yield a received component;
determining a privacy level of the private user data;
recognizing the audio using the received component, the embedded speech recognition system and by accessing the private user data according to the privacy level to yield a recognition result; and
replacing the placeholder with the recognition result in the text to yield an updated message.

8. The computer-readable storage device of claim 7, wherein the private user data is not available to a remote speech recognition system in communication with the computing device.

9. The computer-readable storage device of claim 7, wherein the computer-readable storage device stores additional instructions which, when executed by the processor, cause the processor to perform operations further comprising:
identifying a location of the computing device.

10. The computer-readable storage device of claim 9, wherein the computer-readable storage device stores additional instructions which, when executed by the processor, cause the processor to perform operations further comprising:
determining a privacy level of the private user data according to the location of the computing device.

11. The computer-readable storage device of claim 7, wherein individual names from a user contact list are from the private user data.

12. The computer-readable storage device of claim 7, wherein the private user data comprises one of data in a user contact list, frequently dialed phone numbers, frequently used texted names, data associated with a user location, data associated with a playlist, user history, and multiple hypothesis associated with private information.

13. A system comprising:
a processor; and
a computer-readable storage medium storing instructions which, when executed by the processor, cause the processor to perform operations comprising:
receiving text as part of a message, a placeholder within the text and audio, wherein the system comprises an embedded speech recognition system that accesses private user data on the system;
receiving one of a garbage model, phonemic language model, a language model according to a standard list, and a language model built on the private user data to yield a received component;
determining a privacy level of the private user data;
recognizing the audio using the received component, the embedded speech recognition system and by accessing the private user data according to the privacy level to yield a recognition result; and
replacing the placeholder with the recognition result in the text to yield an updated message.

14. The system of claim 13, wherein the private user data is not available to a remote speech recognition system in communication with the system.

15. The system of claim 13, wherein the computer-readable storage medium stores additional instructions which, when executed by the processor, cause the processor to perform operations further comprising:
identifying a location of the system.

16. The system of claim 15, wherein the computer-readable storage medium stores additional instructions which, when executed by the processor, cause the processor to perform operations further comprising:
determining a privacy level of the private user data according to the location of the system.

17. The system of claim 13, wherein individual names from a user contact list are from the private user data.

18. The system of claim 13, wherein the private user data comprises one of data in a user contact list, frequently dialed phone numbers, frequently used texted names, data associated with a user location, data associated with a playlist, user history, and multiple hypothesis associated with private information.

* * * * *